(12) United States Patent
Neerudu et al.

(10) Patent No.: US 8,839,112 B2
(45) Date of Patent: Sep. 16, 2014

(54) CLONING OR EXTENDING A COMPUTER DESKTOP ON A WIRELESS DISPLAY SURFACE

(75) Inventors: Srinivasa R. Neerudu, Redmond, WA (US); Nelly Porter, Kirkland, WA (US); Casey Dvorak, Seattle, WA (US); Amer A. Hassan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 12/854,152

(22) Filed: Aug. 10, 2010

(65) Prior Publication Data

US 2012/0042252 A1 Feb. 16, 2012

(51) Int. Cl.
*G06F 3/14* (2006.01)
*G09G 5/00* (2006.01)
*G06F 9/44* (2006.01)

(52) U.S. Cl.
CPC ............... *G06F 9/4445* (2013.01); *G09G 5/00* (2013.01)
USPC .............. 715/733; 705/64; 370/252; 370/329

(58) Field of Classification Search
USPC ............ 715/200–277, 700–867; 345/30–111; 370/252; 705/64; 725/74
See application file for complete search history.

(56) References Cited

U.S. PATENT DOCUMENTS

| | | | |
|---|---|---|---|
| 7,168,048 B1 | 1/2007 | Goossen et al. | |
| 7,293,243 B1 | 11/2007 | Ben-Shachar et al. | |
| 7,439,937 B2 | 10/2008 | Ben-Shachar et al. | |
| 7,595,798 B2 | 9/2009 | Ben-Shachar et al. | |
| 7,747,055 B1 | 6/2010 | Vining et al. | |
| 8,145,777 B2 | 3/2012 | Ryman et al. | |

(Continued)

FOREIGN PATENT DOCUMENTS

WO WO 2009/049177 4/2009

OTHER PUBLICATIONS

Doug, "Device Profile: ViewSonic airsync V210 wireless display", Windows for Devices Articles, Dec. 20, 2004, 1-3.

(Continued)

*Primary Examiner* — Ruay Ho
(74) *Attorney, Agent, or Firm* — Jim Sfekas; Kate Drakos; Micky Minhas

(57) ABSTRACT

Techniques are provided for cloning a computer desktop to a wireless display surface. A source computer and a display in communication with a destination computer establish a wireless connection. A user console session of the source computer has a virtual display driver that corresponds to the wireless display. An application of the console session instructs the virtual display driver to render graphics to a display surface. The source computer takes this graphical information that, when executed on a processor generate an image, text, sound or input—encodes it with a remote presentation protocol. Through encoding and decoding image data, text, sound, and input of the user console session transmitted to a wireless display with a remote presentation protocol, fidelity and interactivity are improved.

20 Claims, 6 Drawing Sheets

(56) References Cited

U.S. PATENT DOCUMENTS

| | | | |
|---|---|---|---|
| 8,169,436 | B2 | 5/2012 | Rivera et al. |
| 8,230,096 | B2 | 7/2012 | Mazzaferri |
| 2003/0027517 | A1 | 2/2003 | Callway et al. |
| 2003/0140343 | A1 | 7/2003 | Falvo et al. |
| 2005/0033817 | A1 | 2/2005 | Wei |
| 2005/0132299 | A1 | 6/2005 | Jones et al. |
| 2005/0171788 | A1 | 8/2005 | Shah et al. |
| 2006/0164328 | A1 | 7/2006 | Jaff |
| 2007/0109257 | A1 | 5/2007 | Lee et al. |
| 2007/0143800 | A1* | 6/2007 | Salomons ............ 725/74 |
| 2007/0247449 | A1 | 10/2007 | Mack et al. |
| 2007/0260702 | A1 | 11/2007 | Richardson et al. |
| 2009/0029647 | A1 | 1/2009 | Wei et al. |
| 2009/0079884 | A1 | 3/2009 | Lin |
| 2009/0161572 | A1* | 6/2009 | Lagrange et al. ........ 370/252 |
| 2009/0235170 | A1 | 9/2009 | Golden et al. |
| 2009/0257386 | A1* | 10/2009 | Achir et al. ............ 370/329 |
| 2009/0313116 | A1 | 12/2009 | Ashbaugh |
| 2010/0077085 | A1 | 3/2010 | Cohen |
| 2010/0111494 | A1 | 5/2010 | Mazzaferri |
| 2010/0164839 | A1 | 7/2010 | Lyons et al. |
| 2010/0169791 | A1 | 7/2010 | Pering et al. |
| 2010/0257450 | A1 | 10/2010 | Go et al. |
| 2010/0280956 | A1* | 11/2010 | Chutorash et al. ........ 705/64 |
| 2011/0019565 | A1* | 1/2011 | Nezou et al. ............ 370/252 |
| 2012/0054001 | A1 | 3/2012 | Zivkovic et al. |

OTHER PUBLICATIONS

Stern, "Toshiba Satellite", http://www.engadget.com/2010/02/01/toshiba-satellite-e205-with-intel-wireless-display-review/, accessed Aug. 25, 2010, 1-9.

"Actual Multiple Monitors 2.3", http://www.softpedia.com/get/Desktop-Enhancements/Other-Desktop-Enhancements/Actu, accessed Aug. 26, 2010, 1-3.

"ATI Eyefinity Multiple Display Technology", AMD, retrieved Aug. 25, 2010, 14 pages.

"Dual Monitor Hardware & Software", http://www.dual-monitor.biz/, accessed Aug. 26, 2010, 1-7.

"Inter-Tel Web Conferencing and Remote Support User Guide," Oct. 2007, 87 pgs, downloaded Jan. 12, 2010, http://linktivity.com/pdfs/Web%20Conferencing%20%20Remote%20Support%204.5%20User%20Guide2.pdf.

"Multiple Display Content Control", http://discuss.extremetech.com/forums/thread/1004441724.aspx, accessed Aug. 26, 2010, 1-9.

Boyaci et al., "BASS Application Sharing System," IEEE, 2008, 8 pgs, downloaded Jan. 12, 2010, http://www1.cs.columbia.edu/~boyaci/papers/3454a432.pdf.

Siebert, "What is VMware View?", http://searchvmware.techtarget.com/generic/0,295582, accessed Aug. 26, 2010, 1-3.

Xu et al., "Optimizing the Performance of a Windows Network Projector", http://msdn.microsoft.com/en-us/library/bb931330, accessed Aug. 26, 2010, 1-7.

* cited by examiner

CLONING OR EXTENDING A COMPUTER DESKTOP ON A WIRELESS DISPLAY SURFACE

BACKGROUND

It has been common to share a computer desktop and applications with a remote client using remote presentation protocol (RPP) technologies, such as Remote Desktop Protocol (RDP), and Independent Computing Architecture (ICA). Such shared computing systems typically are established through instantiating a user session for the RPP session on the server of the session. Where the server's screen is to be shared with a client of the session, the RPP session obtains that information from a console session that is local to the server. During the RPP session, the client transmits the keyboard presses and mouse clicks or selections to the server, and the server sends screen updates back in the other direction to the client over a network connection (e.g., the INTERNET). As such, the user of the client has the experience as if his or her computer is executing the applications locally, when in reality the client computer is only sent screenshots of the applications as they appear on the server side.

It has also been common for a computer to display images on a display device (such as a television or a monitor) via a cable, such as a composite (RCA) cable or a High-Definition Multimedia Interface (HDMI) cable. There also exists technology that enables a computer to display images on a display device wirelessly. There are many issues with displaying images on wireless devices, some of which are well known.

SUMMARY

The present invention provides improved techniques to display screen data and enable the computer desktop experience on wireless displays. As used herein, screen data may comprise images to be displayed on a monitor (such as a computer desktop), audio to be played through one or more speakers, and input to a computer (such as movement of a cursor, manipulation of a multi-touch track pad, or keyboard presses). Screen data that is sent to a destination computer and output thereon will be referred to with terms such as being "displayed," "output," or "presented," and this may include the output of audio through one or more speakers. Prior art techniques suffer from constraints in bandwidth and buffering, which negatively impact both fidelity (the quality of the displayed screen data) and interactivity (the rate at which a change to the screen data is displayed on the wireless display). It would therefore be an improvement over the prior techniques to provide techniques for wireless displays that offer a high level of fidelity and interactivity. In doing so, a wireless display configuration may provide as a computer desktop experience to a user that is nearly identical to what the user experiences when using a monitor connected to a source computer directly through a cable.

As used herein, the term "wireless display" is not intended to convey that the display has no wires, but rather that there is not a continuous wire between the wireless display and the source computer that the source computer uses to transmit images to the wireless display. In an embodiment, a source computer and a destination computer that is in communication with a wireless display establish a wireless connection, and the source computer has a virtual display driver that corresponds to the wireless display (similar to how a conventional graphics display driver corresponds to a wired display of the source computer). A user who is directly using the source computer has a user console session on that source computer. In that user console session, the user executes applications. Those applications execute to produce graphics (such as an application window on a computer desktop), and to produce those graphics for the wireless display, an application instructs the virtual display driver to render graphics to a memory area or a display surface of the source computer. The source computer takes this graphical information—be it an image, or computer-executable instructions that, when executed on a processor generate an image—encodes it with a remote presentation protocol (RPP) and sends it to the wireless display from the user console session.

Other techniques for using a RPP to transmit data require more than one user session to do so. For instance, versions of the terminal server RPP require a client computer to connect to the source computer with a second user session. Then, to share the user console session's computer desktop with the client computer, the second user session intercepts screen data from the user console session and sends it to the client, and injects user input (e.g. cursor movements) from the client computer into the user console session.

In using the present techniques, the paradigm is changed from a conventional RPP session. A conventional RPP session comprises a user at a client computer sending input to the server and receiving images back. In contrast, under the present techniques, the user is logged into the console of the source computer where he or she makes input into the server, and then the screen data generated from that local input is transmitted to the destination computer for display.

As a result of transmitting RPP data with a single user session on the source computer, the process of the source computer encoding screen data with a remote presentation protocol (RPP) and the display computer decoding the screen data with the remote RPP occurs outside of a conventional remote presentation session. That is, in a remote presentation session, a server may authorize a client's credentials, and create a separate user session on the server in which the remote presentation session occurs. In contrast, in the present invention, while screen data is encoded according to a remote presentation protocol, other operations commonly associated with a remote presentation session—like creating a separate operating system session—may not occur.

There exist operating systems that include sessions in addition to conventional user sessions. For instance, versions of the MICROSOFT WINDOWS operating system contain a "session 0," in which system services are executed, but no user processes are executed. These session 0 system services may include a RPP service that encodes and transmits screen data. The discussion of this invention that discusses the use of a single user session should not be read to exclude embodiments of the invention that include non-user sessions, such as session 0.

Through encoding and decoding image data transmitted to a wireless display with a remote presentation protocol, fidelity and interactivity are improved. These operations may reduce the amount of bandwidth and buffering necessary to transmit the screen data across a wireless communications network. In using less bandwidth to transmit screen data, bandwidth is then available to transmit screen data in higher fidelity. Likewise, in using less bandwidth to transmit screen data, that screen data be transmitted to a wireless display in a nearer amount of time to when it is generated, improving interactivity. Similarly, by reducing the amount of buffering needed to encode the screen data, such as by using lower-latency codecs, interactivity is improved.

The virtual device driver may be both extended and duplicated/cloned to the wireless display surface. To the source computer, the virtual display driver may be treated as equivalent to the graphics device driver of any monitor physically coupled to the source computer. Graphics commands from the virtual display driver are taken, encoded and transmitted to the wireless display computer, where they are decoded. The wireless display computer may comprise a lightweight decoding component that is configured to decode and render graphics. This wireless display computer may further comprise an integrated circuit that is part of the wireless display.

While the primary embodiment discussed herein involves transmitting screen data to a wireless display, it may be appreciated that these techniques may be applied across other communications channels where fidelity and interactivity are constrained. For instance, these techniques may be applied where a source computer communicates with a monitor over a Universal Serial Bus 2.0 (USB 2.0) connection.

It can be appreciated by one of skill in the art that one or more various aspects of the invention may include but are not limited to circuitry and/or programming for effecting the herein-referenced aspects of the present invention; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable media for displaying a computer desktop on a wireless display surface are further described with reference to the accompanying drawings in which.

DETAILED DESCRIPTION OF ILLUSTRATIVE EMBODIMENTS

Figure 1:
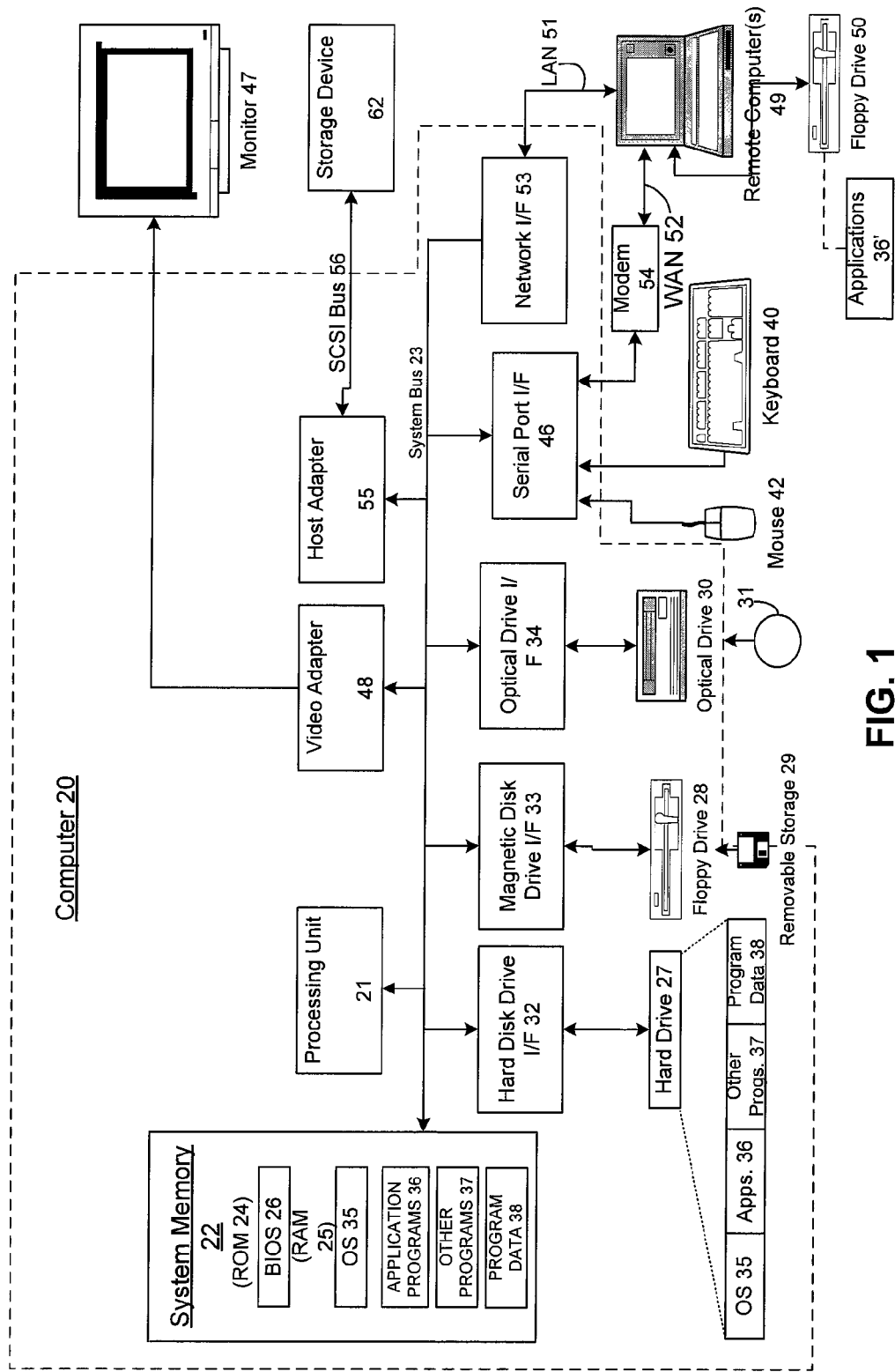
FIG. 1 depicts an example general purpose computing environment in which techniques described herein may be embodied.

Embodiments may execute on one or more computer systems. FIG. 1 and the following discussion are intended to provide a brief general description of a suitable computing environment in which the disclosed subject matter may be implemented.

The term circuitry used throughout the description can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by instructions read from firmware and/or software. Logical processor(s) can be configured by instructions embodying logic operable to perform function(s) that are loaded from memory, e.g., RAM, ROM, firmware, and/or mass storage. In an example embodiment where circuitry includes a combination of hardware and software, an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary general purpose computing system is depicted. The general purpose computing system can include a conventional computer 20 or the like, including at least one processor or processing unit 21, a system memory 22, and a system bus 23 that communicative couples various system components including the system memory to the processing unit 21 when the system is in an operational state. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as flash memory cards, digital video disks, random access memories (RAMs), read only memories (ROMs) and the like may also be used in the exemplary operating environment. Generally, such computer readable storage media can be used in some embodiments to store processor executable instructions embodying aspects of the present disclosure.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37 and program data 38. Upon execution by the processing unit, the computer-readable instructions cause the actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
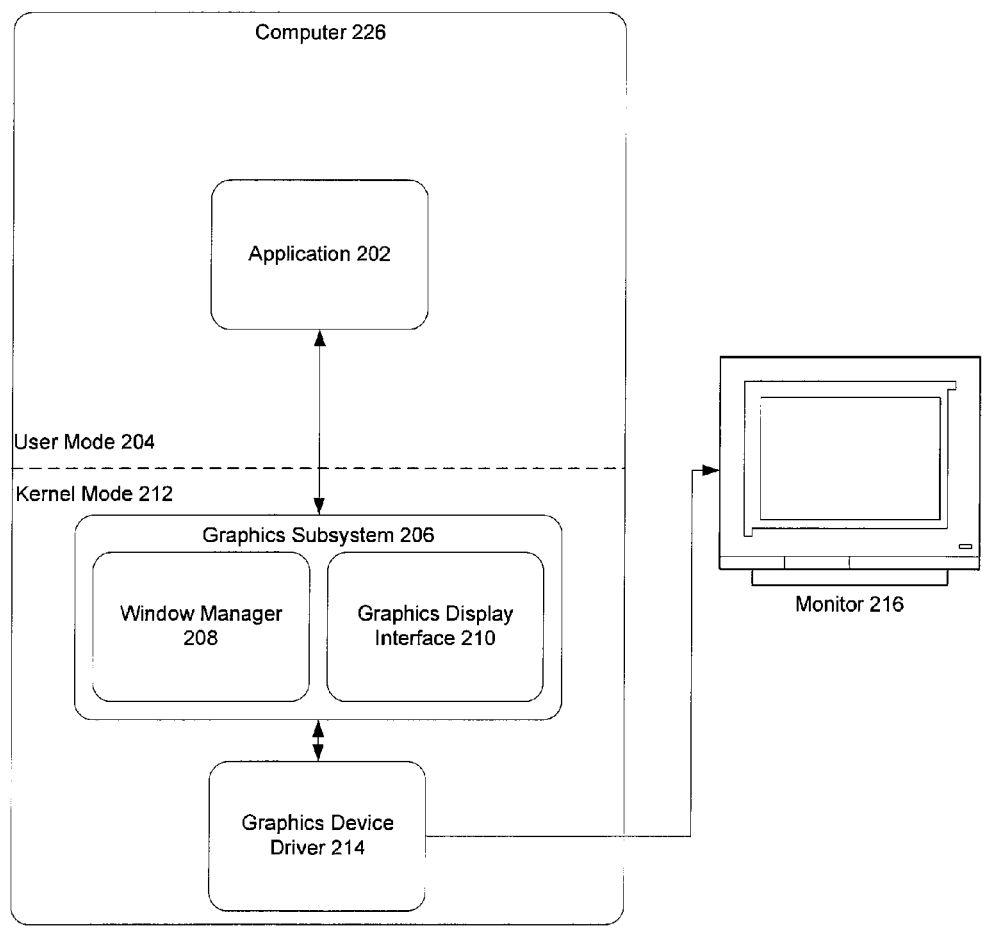
FIG. 2 depicts an example computer system that emphasizes the components involved in generating computer graphics and displaying them on a monitor.

FIG. 2 depicts an example computer system that emphasizes the components involved in generating computer graphics and displaying them on a monitor. The computer system of FIG. 2 may be effectuated using the computer of FIG. 1. The architecture of components depicted in FIG. 2 are similar to the architecture of some versions of the MICROSOFT WINDOWS operating system. While FIG. 2 (and later FIG. 3) depict a user mode 204 and a kernel mode 212, it may be appreciated that the present techniques may work in system architectures that do not have such modes.

A user's session, including application 202, executes in user mode 204—a mode where processes cannot access the memory of other processes save for through application programming interface (API) functions or commands. Processes in user mode also cannot interfere with interrupts or context switching. When application 202 draws to a display surface, application 202 sends a graphics API command to graphics subsystem 206. Graphics subsystem 206 comprises window manager 208, which controls the placement and appearance of windows within an operating system's desktop, and graphics device interface (GDI) 210, which is responsible for representing graphical objects and transmitting to an output device, such as a computer monitor. Graphics subsystem 206 executes in kernel mode 212 (sometimes referred to as "system mode"), a mode in which any process may execute any instruction and reference any memory address.

Draw commands can be received from applications (including a subcomponent of an operating system that is responsible for creating the desktop) and be processed by graphics device interface 210. Graphics device interface 210 in general can include a process that can generate graphical object draw commands. Graphics device interface 210 in this example embodiment can be configured to pass its output to the display driver that is attached to the session.

When graphics subsystem 206 has processed the graphics API command received from application 202 to produce a result (such as a bitmap stored in a memory address), graphics subsystem 206 sends the result to graphics device driver 214. Graphics device driver 214 is a process that communicates with the output device 216 through a communications subsystem. When graphics subsystem 206 invokes a routine in graphics device driver 214, graphics device driver 214 issues commands to the output device and an image is produced on that output device.

Figure 3:
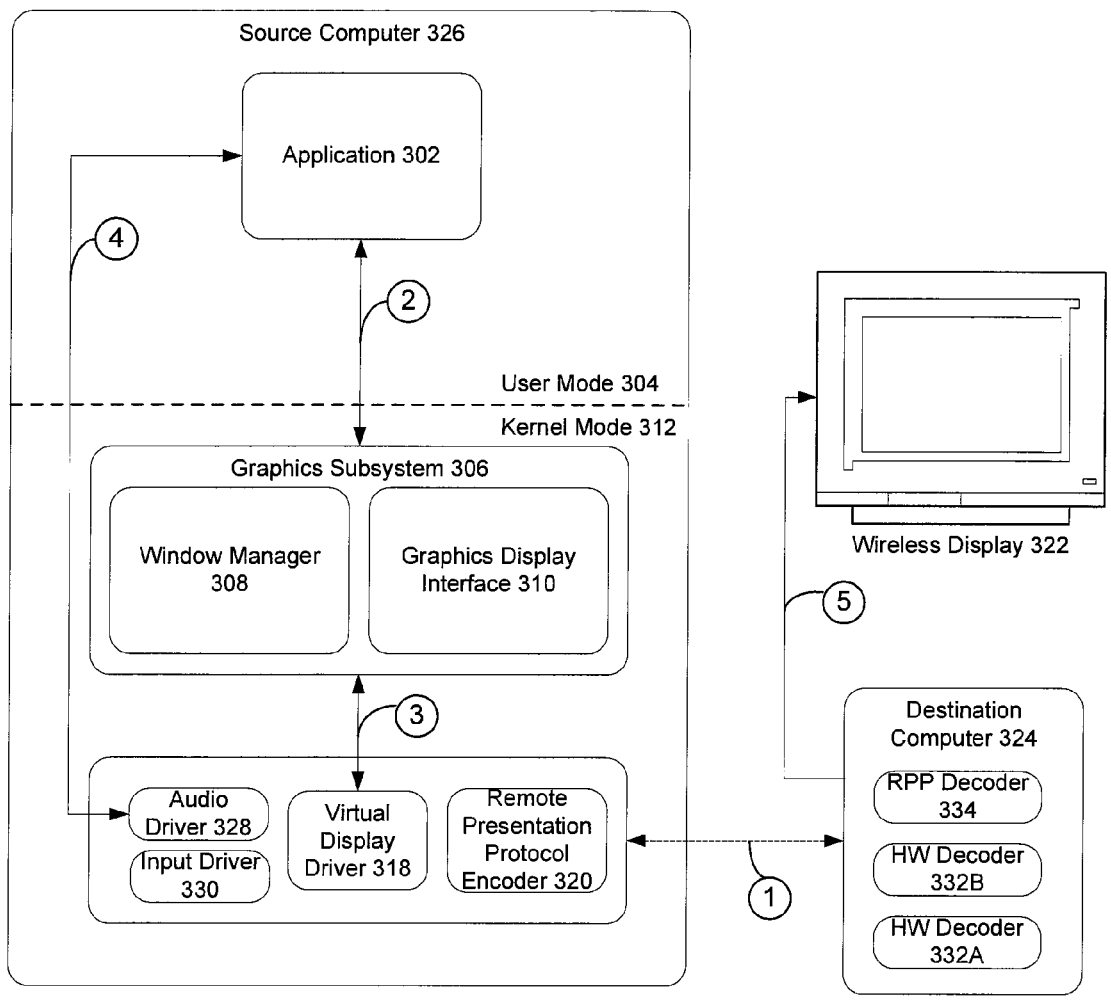
FIG. 3 depicts an example computer system that depicts techniques for displaying images on a wireless display.

FIG. 3 depicts an example computer system that depicts techniques for displaying screen data on a wireless display, and that do so via encoding and decoding techniques. The architecture of components depicted in FIG. 3 are similar to the architecture of some versions of the MICROSOFT WINDOWS operating system.

Application 302, user mode 304, graphics subsystem 306, window manager 308, graphics device interface 310, and kernel mode 312 may be similar to application 202, user mode 204, graphics subsystem 206, window manager 208, graphics device interface 210, and kernel mode 212 as depicted in FIG. 2, respectively. While FIG. 3 depicts that several operations are performed by software processes, it may be appreciated that they may be performed by hardware, or a combination of hardware and software. For instance, similar operations may be performed by an application-specific integrated circuit (ASIC) that decodes graphics data prior to it being displayed on a wireless display 322.

Virtual device driver 318 is a device driver configured to issue commands to a wireless display surface 322 in a manner similar to how graphics device driver 214 is configured to issue commands to output device 216. Virtual device driver 318 may communicate with wireless display surface 322 via a wireless connection such as a Wireless Display connection (depicted as communication path 1). An example wireless display connection protocol enables devices to create ad-hoc networks—to communicate with each other without prior setup or the use of separate wireless access points. In a common scenario, a source computer 326 and a wireless display surface 322 discover each other, with source computer 326 taking the role of a soft access point ("AP"). The wireless display surface 322 may participate in this operation of discovery through the use of a destination computer 324 that is connected to the wireless display surface 322 through a cable—such as a HDMI cable—or through a destination computer 324 that is built into the wireless display surface 322. After discovery, confirmation of creating a wireless display connection may be established through user input at source computer 326, such as pressing a particular button on a keyboard, or the input of a short alphanumeric code displayed on the wireless display surface 322.

Virtual device driver 318, audio driver 328 (which receives audio data from application 302) and input driver 330 (which receives user input from an input device) communicate with remote presentation protocol (RPP) encoder 320. Graphics data from application 302 passes along communication channel 2 (between the application 302 and the graphics subsystem 306) and then communication channel 3 (between the graphics subsystem 306 and the virtual display driver 318). Audio commands generated from application 302 are passed from application 302 to audio driver 328 along communication channel 4. RPP encoder 320 is configured to compress screen data (including images, sound, and input) according to a RPP. While RPP encoder 320 is depicted here as receiving graphics data from graphics device interface 310, it may be appreciated that RPP encoder 320 may receive graphics data from a variety of areas within computer 326, such as a media file stored on a disk, a graphics command (like a DIRECTX command), a composition image from a graphics subsystem, or an animation image or command from an animation subsystem. A RPP used by RPP encoder 320 may to classify the screen data to compress it with different encoding techniques applicable to the specifics of particular screen data, thereby improving the fidelity and/or interactivity of the screen data being presented.

Bandwidth may be conserved when encoding screen data with a RPP in a variety of ways. For instance, an image may be subdivided into tiles, and only those tiles that change between images ("dirty tiles") may be sent. When tiles are received by a client, the client may cache the tiles, then the server may instruct the client to re-use cached tiles instead of the server sending identical tiles. Where windows are moved or scrolled, that information may be determined, and the server may instruct the client to re-use the identical information corresponding to that window move or scroll between a previously received image frame and a new image frame. Another way to conserve bandwidth is, rather than sending the graphical result of rendering a graphics command (such as a resultant bitmap image), the server may send the graphics commands themselves, which are then rendered by the client. Where graphics rather than graphics commands are sent, these graphics may be compressed, such as via a H.264 encoder, and a single desktop frame may be compressed with multiple codecs. For instance, the text on a computer desktop may be compressed with a first codec, whereas the images on that same computer desktop may be compressed with a second codec. These are some techniques that may be used by a remote presentation protocol, but the techniques described herein do not make up an exhaustive list of such techniques.

Upon being encoded with remote presentation encoder 320, the encoded screen data is transmitted to destination computer 324 in adherence with the communication protocol with which source computer 326 and wireless destination computer 324 communicate (such as a IEEE 802.11n protocol). The encoded screen data transmitted across this communication channel appears on the channel to be RPP data. That is, where the data is transmitted as a plurality of packets, each packet appears to be a RPP packet.

Destination computer 324 may comprise logic and/or circuitry configured to decode RPP data received from source computer 326. As depicted, destination computer comprises lightweight RPP decoder 334. Lightweight RPP decoder 334 may comprise a software process executed on a general purpose CPU that is receives RPP packets from a network interface of destination computer 324. Lightweight RPP decoder 334 is configured to decode received RPP data and display it on wireless display 322. Lightweight RPP 334 decoder may offload some of this decoding to hardware decoders, such as depicted HW decoders 332A and 332B. A hardware decoder may comprise, for example, specialized hardware configured to decode RemoteFX-encoded data or H.264-encoded data. Lightweight RPP decoder 334 may be considered lightweight because does not contain logic to process aspects of a conventional RPP session. For instance, Lightweight RPP decoder 334 may not contain logic to initiate or terminate a RPP session, to store and/or transmit user credentials to a RPP server to validate a RPP session, to encode screen data, or receive screen data including images, sounds, that is input locally at destination computer 324.

Interactivity may be further improved by assigning a priority to portions of a desktop that correspond to user input. This is because someone viewing a desktop may be drawn to those portions of the desktop that correspond to user input, so the rate at which these portions are updated may impact that person's impression of interactivity more than the rate at which other portions of the desktop are updated. This priority may be assigned in a variety of ways. For instance, where a frame of a desktop is subdivided into tiles, the tile or tiles that contain(s) all or part of a user's cursor may be given an assigned priority. Also, for instance, where user input results in a change in the size, shape, or position of a window on the desktop (such as by the user using the cursor to drag a corner of a window), the tile or tiles that contain all or part of this changing window may be assigned a higher priority. A high priority may give screen data preference in how it is processed in a queue of the source computer or destination computer, such as being placed in a queue ahead of lower-priority screen data. These queues may include a quote of screen data to be encoded, decoded, or transmitted.

Source computer 326 may be able to encode images according to a variety of techniques, and do this based on attributes of destination computer 324 (such as destination computer 324's presence or lack thereof of hardware dedicated to decode a particular codec, the overall processing power of destination computer 324, destination computer 324's amount of RAM, whether and, if so, what type of GPU destination computer 324 possesses), as well as the communications network via which source computer 326 and destination computer 324 communicate. In a common scenario, source computer 326 may be a general purpose computer that, in addition to transmitting data to be displayed on wireless display 322 (along communication channel 5), may be used for other purposes concurrently, such as to execute a web browser or an e-mail client. In contrast, in this common scenario, destination computer 324 may be dedicated to decoding image data received from source computer 326 and displaying that decoded image on wireless display 322. Given that, in this scenario, processing resources of source computer 326 may be used for things other than encoding and transmitting data to destination computer 324, whereas destination computer 324 may be used exclusively or nearly exclusively for receiving, decoding, and presenting data received from source computer 326, it may be preferable for as much processing to be done as is possible on destination computer 324. Thus, the amount of encoding performed by source computer 326 may be determined based on a maximum decoding capability of destination computer 324. This may be accomplished, for instance, by when source computer 326 and destination computer 324 establish communication, destination computer 324 indicates to source computer 326 its capabilities to receive, decode and display image data.

This indication from destination computer 324 may comprise, for instance, one or more codecs that destination computer 324 may decode, as well as an indication of preference among those one or more codecs. For instance, the indication may state that destination computer 324 is capable of decoding both RemoteFX and H.264 codecs, but prefers H.264 because it has specialized hardware to decode H.264, while it must decode RemoteFX with a general purpose CPU. Where a codec format allows for a variable amount of compression or quality (where a low amount of compression may be decoded more quickly but requires more bandwidth to transmit and a high amount of compression may not be decoded as quickly but requires less bandwidth to transmit), this indication from destination computer 324 may also include the degree of compression that destination computer 324 is capable of decoding.

This indication from destination computer 324 may also comprise other information about the ability of the destination computer to decode data encoded with a remote presentation protocol. For instance, where the remote presentation protocol may subdivide a desktop frame into tiles and instruct destination computer 324 to cache and re-use tiles, destination computer 324 may indicate to source computer 326 that it has a limited amount of memory with which to cache tiles.

Source computer 326 may receive this indication from destination computer 324 and from the indication and information about source computer 326, determine how to encode information with remote presentation encoder 320. For instance, while destination computer 324 may indicate a preference to use a particular format because it has hardware dedicated to decoding that format, that may be a particularly tough format for source computer 326 to encode, based on the particulars of the source computer 326 architecture. Given this information, source computer 326 may select a way to encode computer desktops with remote presentation encoder 320, and use this selected way to encode when encoding computer desktops to be sent to destination computer 324.

In another common scenario, while destination computer 324 is dedicated to decoding and presenting screen data received from source computer 326, destination computer 324 has limited processing resources because it is a low cost, embedded device. In this scenario, source computer 326 may attempt to overcome the limitations of destination computer 324 by performing a great deal of processing locally (such as classifying different parts of a computer desktop and encoding the different parts differently, to make decoding less resource intensive). However, because source computer 326 may also be executing user applications (such as those applications that make up the screen data that is being transmitted to destination computer 324), a favored situation may involve source computer 326 devoting as much processing resources to encoding screen data without denying the user applications any processing resources (e.g. only using otherwise available processing resources).

In another common scenario, the screen data may comprise a video with sound and source computer 326 may be in communication with destination computer 324 for the purpose of presenting that screen data on a home theater that includes wireless monitor 322. In such a scenario, as well as other scenarios, it may be important that the sound and video are played synchronously. In such a scenario, remote presentation encoder 320 may receive sound or audio data from an audio driver of source computer 326, encode this sound data and send it to destination computer 324 along with the image data of the video. Source computer 326 may further mark the sound and image data, such as with a time code, to signify what sound data synchronizes with what image data. Destination computer 324 may use this time code information so that it instructs wireless display 322, and an audio output means communicatively connected to destination computer 324 to both respectively play the sound and image synchronously.

Figure 3A:
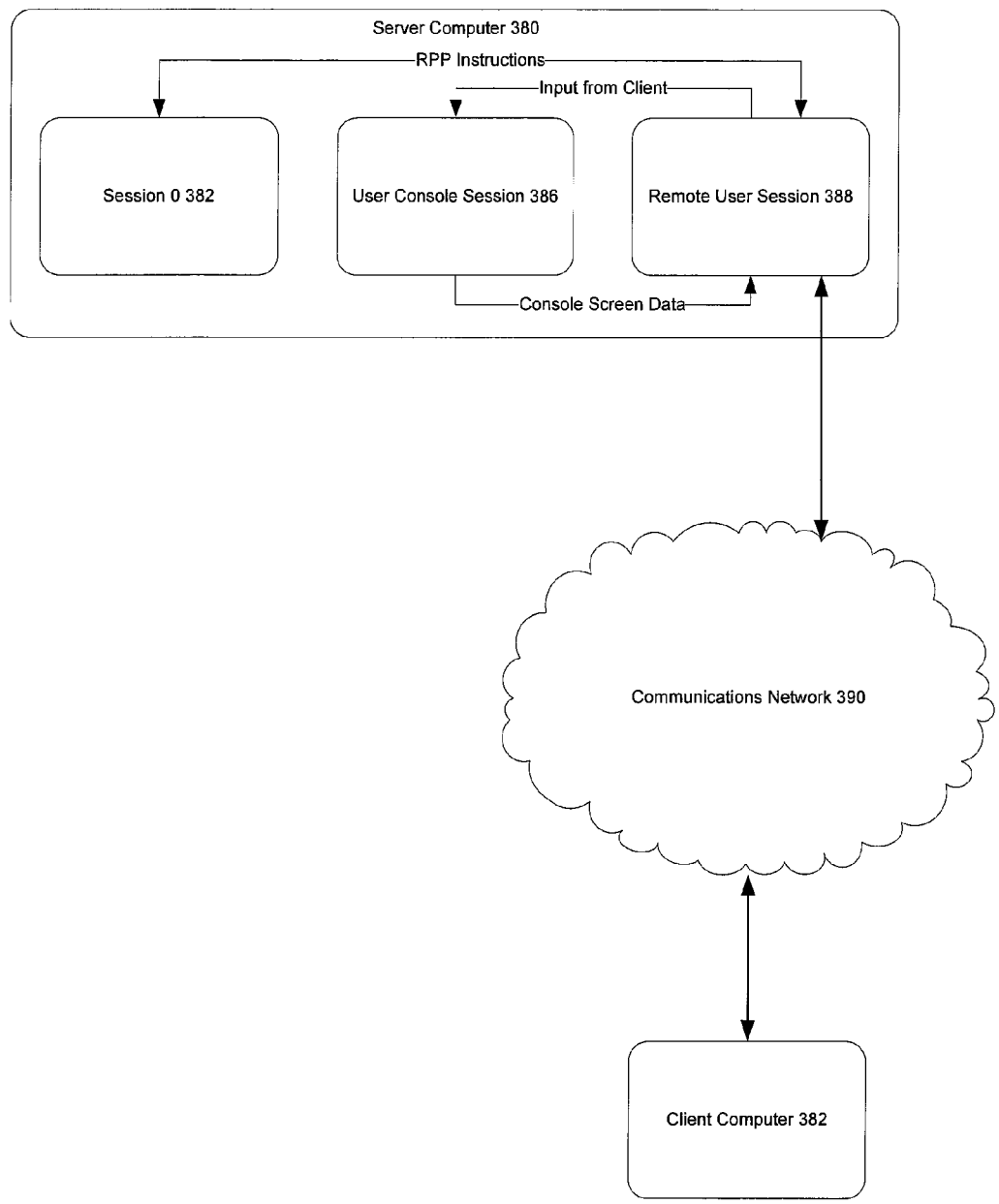
FIG. 3A depicts the sessions on a server in an example computer system where a conventional remote presentation protocol (RPP) session occurs.

FIG. 3A depicts the sessions on a server in an example computer system where a local user desktop is shared in a conventional remote presentation protocol (RPP) session. Server computer 380 is configured to serve remote presentation sessions. Server computer 380 comprises session 0 382, a non-interactive session (e.g. no user account is associated with the session by an operating system) that comprises a system service configured to encode and transmit RPP data generated by user sessions. Note that the depiction of session 0 382 is exemplary, and there are other system architectures and embodiments where the present invention may be implemented. Server computer 380 also comprises user console session 386, an interactive user session for the user at the console (e.g. it receives input from the local mouse and keyboard, rather than input across a communications network in a RPP session, and displays output on local monitors and speakers). Server computer 380 also comprises remote user session 388, a user session created on server computer 380 when server computer 380 and client computer 382 establish a RPP session across communications network 390.

Remote user session 388 is the user session that communicates with client computer 382 in the RPP, but it is the local screen that's to be shared (or mirrored or duplicated) with client computer 382, and that local screen is associated with a different user session—user console session 386. To share the local screen with client computer 382, remote user session 388 receives input from client computer 382 and transmits that user input to user console session 386, where it is processed. Likewise, the screen data that user console session 386 creates is received by remote user session 388. Remote user session 388 takes that screen data, and sends it to session 0 382 for it to be encoded with a RPP and transmitted to client computer 382 for display. In the depicted embodiment, user console session 386 does not interact with session 0 382 for the purpose of encoding screen data with a RPP and transmitting it to client computer 382. That process is handed by remote user session 388.

Figure 3B:
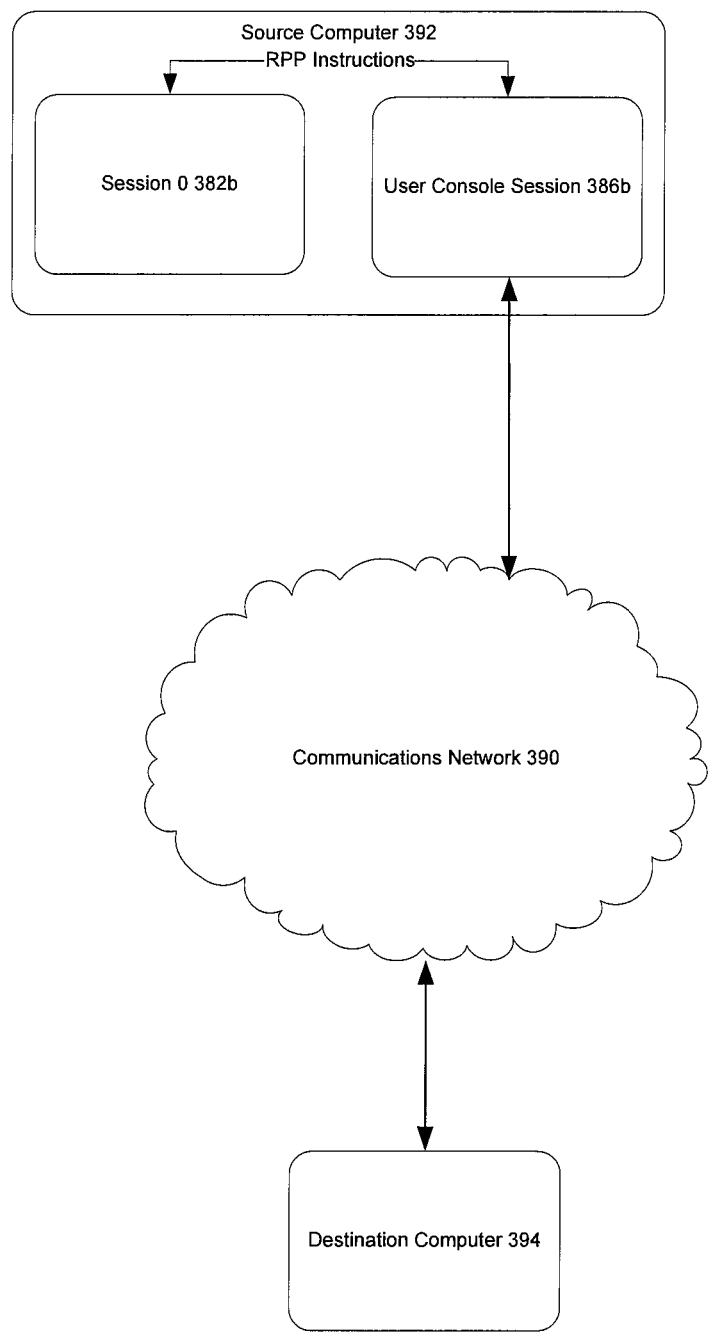
FIG. 3B depicts the sessions on a server in an example computer system where displaying images on a wireless display occurs.

FIG. 3B depicts the sessions on a server in an example computer system where a local user desktop is displayed on a wireless display. In contrast to the conventional RPP session depicted in FIG. 3A, there is no additional user session created for transmitting data (the remote user session 388 of FIG. 3A). Rather, the connection with destination computer 394 is managed by user console 386b of source computer 392, which also manages the encoding of screen data by session 0 382b (note that, as with FIG. 3A, session 0 is not mandatory, and the present invention may function in different system architectures). User console session 386 and destination computer 394 establish a wireless communication channel through communication network 390. The user console session 386b generates local screen data, such as a computer desktop. User console session 386b sends instructions to session 0 382b to encode that screen data with a RPP and transmits this encoded screen data directly to destination computer 394—it does not pass through a second user console, like how remote user session 388 of FIG. 3A is involved in the RPP data transmission in FIG. 3A.

Figure 4:
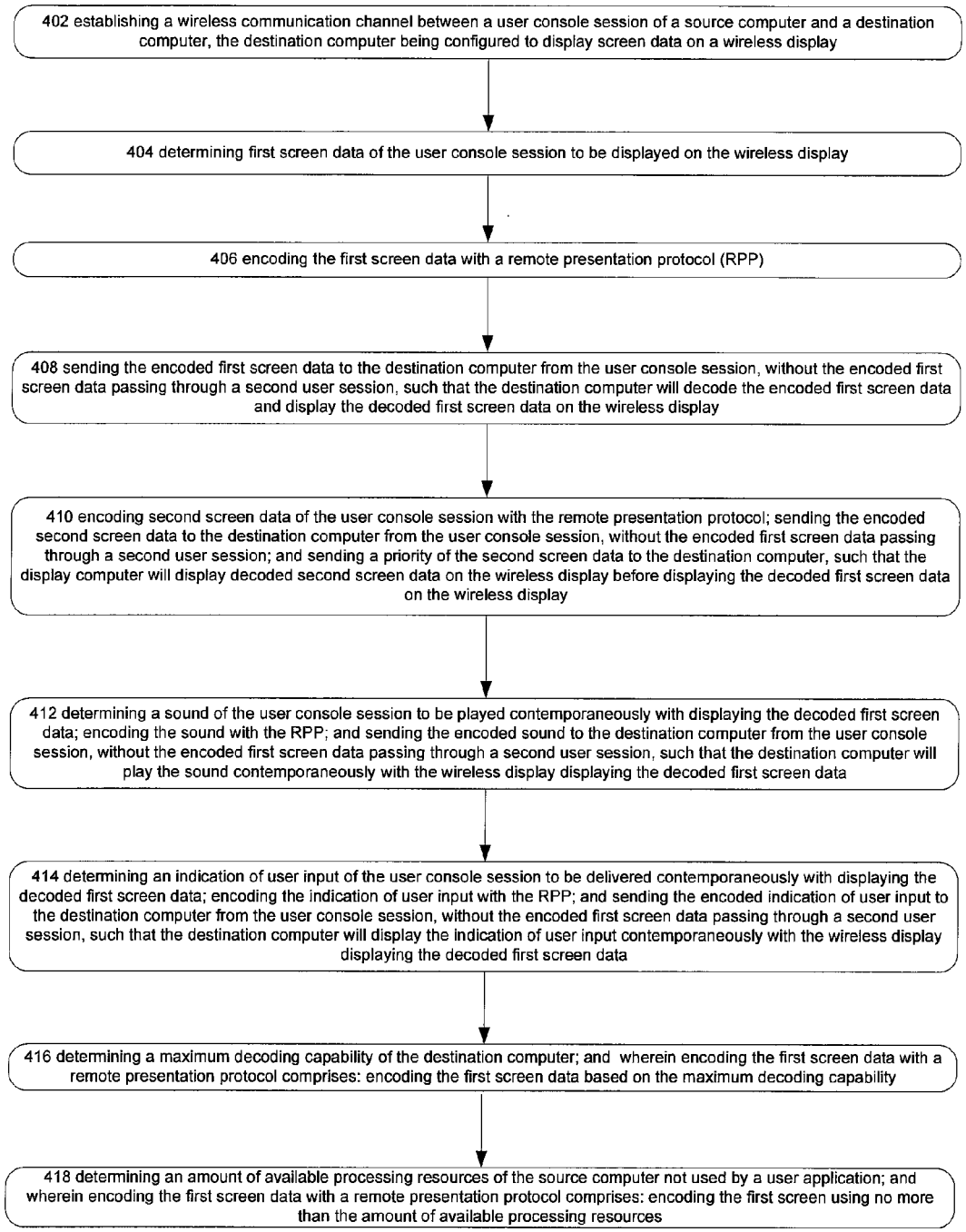
FIG. 4 depicts example operational procedures for displaying images on a wireless display.

FIG. 4 depicts example operational procedures for displaying images on a wireless display. The operational procedures of FIG. 4 may be implemented on the computer system of FIG. 3. It may be appreciated that the order of operations is not mandatory, but the present invention may be implemented with varying permutations of the order of operations, and that not every operation needs to be performed to implement the present invention. In the operational procedures of FIG. 4, source computer generates screen data, such as a computer desktop, then encodes and sends that computer desktop to the destination computer (such as destination computer 324 of FIG. 3), which decodes it and displays it on a wireless display (such as wireless display 322 of FIG. 3). This process of encoding and decoding screen data is performed with a remote presentation protocol (RPP) within a user console session, so this encoding and decoding may occur outside of a remote presentation session (e.g. a remote presentation session may not be established at the beginning of the operational procedures, there may be no validation of user credentials, a separate user session may not be created, and a remote presentation session may not be terminated at the end of the operational procedures). Through implementing these operational procedures, a high level of fidelity and interactivity is provided through the wireless display, making it very similar to the level of fidelity and interactivity offered by a wired display.

The operational procedures begin with operation 402. Operation 402 depicts establishing a wireless communication channel between a user console session of a source computer and a destination computer, the destination computer being configured to display screen data on a wireless display. This wireless communication channel may comprise, for instance, a Wireless USB or Wireless HD communication channel. The communication channel may be established between a source computer (such as source computer 326 of FIG. 3) and a destination computer (such as destination computer 324 of FIG. 3). The destination computer may comprise a ASIC embedded within a wireless display, or a computer physically coupled to a wireless display, such as an embedded system "set top box." The destination computer may comprise specialized circuitry apart from a general purpose processor that is configured to decode remote presentation data and render graphics on the wireless display.

Operation 404 depicts determining first screen data of the user console session to be displayed on the wireless display. This screen data may comprise a computer desktop or other image, audio, and indications of user input. This determination may occur as a result of a graphics subsystem of the source computer rendering a computer desktop to a memory area of the source computer. Where the wireless display is used to extend a display of the source computer, rather than mirror a display of the source computer, this screen data may not be displayed by a display of the source computer, but only by the wireless display.

Operation 406 depicts encoding the screen data with a remote presentation protocol (RPP). This process of encoding the screen data may occur outside of a remote presentation session in that a remote presentation session may not be established at the beginning of the operational procedures, there may be no validation of user credentials, and/or a remote presentation session may not be terminated at the end of the operational procedures. The encoded first screen data may comprise, for instance, an image encoded with a H.264 format, or an indication of cached screen data for the wireless device computer to use.

Operation 406 may include encoding a first portion of the first screen data with a first codec; and encoding a second portion of the first screen data with a second codec, the second codec differing from the first codec. For instance, the first portion may comprise a representation of text (such as an image that represents text, and that text may be extracted from) and the second portion may comprise a near-photographic quality image. Or the first portion may comprise a black and white image, and the second portion a color image. Though these two portions may be part of the same frame in the screen data, it may be that they are better encoded using different codecs, and this may be done.

Operation 408 depicts sending the encoded first screen data to the destination computer from the user console session, without the encoded first screen data being transmitted a second user session, such that the destination computer will decode the encoded first screen data and display the decoded first screen data on the wireless display. The source computer and destination computer communicate over the established wireless communication channel. When the source computer sends the encoded first screen data to the destination computer, it does so using this communication channel, but it does not first establish a remote presentation session across this communication channel before doing so. In response to receiving the encoded first screen data, the destination computer decodes the data and assembles it on the wireless display. While the decoded first screen data corresponds to the first screen data, it may not exactly match the first screen data. For instance, if the first screen data is encoded and then decoded with a lossy codec, some of the image will be lost, and the decoded first screen data will be different from than first screen data.

Operation 410 depicts encoding second screen data of the console session with the remote presentation protocol; sending the encoded second screen data to the destination computer from the user console session, without the encoded second screen data being transmitted a second user session; and sending a priority of the second screen data to the destination computer, such that the display computer will display decoded second screen data on the wireless display before displaying the decoded first screen data on the wireless display.

Screen data sent between the source computer and the destination computer may be assigned a priority. Screen data or portions of screen data that have a great affect on a user's impression of the interactivity of the display may be assigned a high priority so that they are displayed more quickly than other images. For instance, when a user moves a cursor on a computer desktop or re-sizes an application window (types of input to a source computer), he or she may be focused on seeing that change occur on the wireless display, as opposed to, for instance, a clock in corner of the display update its time. So, this kind of screen data that the user bases his impression of interactivity on may be given a high priority by the source computer. Then high priority screen data may be processed preferably. Where the source computer has queues to process screen data (such as a queue for encoding or a queue for transmitting), this high priority data may be placed in a queue ahead of non-high priority screen data. High priority screen data may be similarly be given preferential treatment in a queue of the destination computer (such as in a decode queue, or a display queue), or when high priority data is ready to display, screen data may be flushed to the screen immediately.

Operation 412 depicts determining a sound of the user console session to be played contemporaneously with displaying the decoded first screen data; encoding the sound with the RPP; and sending the encoded sound to the destination computer from the user console session, without the encoded sound being transmitted a second user session, such that the destination computer will play the sound contemporaneously with the wireless display displaying the decoded first screen data.

This operation may be effectuated by encoding the first screen data with a time stamp, the time stamp indicating a time at which the screen data is to be displayed; and encoding the sound with a second time stamp, the second time stamp indicating a second time at which the sound is to be played, the time stamp and the second time stamp indicating to play the sound contemporaneously with the wireless display displaying the decoded first screen data. The time stamps may denote contemporaneous play—that is the time stamps may not be identical, but may differ by a small amount, such that the sound is played while the screen data is displayed. In assigning time stamps to screen data and sounds, and then the destination computer playing that screen data and sounds according to the time stamps, synchronization between the screen data and sounds may be maintained.

In addition to the source computer transmitting screen data to be displayed on the wireless display, the source computer may also transmit sound data to be played on a speaker (for instance, speakers built into the wireless display). The sound may be captured from an audio driver of the source computer similarly to how screen data is captured from a display driver of the source computer, as well as encoded, transmitted, decoded, and played in a similar manner.

Operation 414 depicts determining an indication of user input of the user console to be delivered contemporaneously with displaying the decoded first screen data; encoding the indication of user input with the RPP; and sending the encoded indication of user input to the destination computer from the user console session, without the encoded user input being transmitted a second user session, such that the destination computer will display the indication of user input contemporaneously with the wireless display displaying the decoded first screen data. This user input may comprise, for instance, text entered by a user on a keyboard, or a cursor movement made by a user using an input device like a mouse or track pad. This indication of user input may be encoded and transmitted in a similar manner as screen data is encoded and transmitted.

Operation 416 depicts determining a maximum decoding capability of the destination computer; and wherein encoding the first screen data with a remote presentation protocol comprises encoding the first image based on the maximum decoding capability. In some scenarios, the destination computer is dedicated to receiving and displaying screen data (and audio) from the source computer, so it may devote all of its processing resources to this task without negatively impacting another process that it is to carry out. In contrast, the source computer may be a general purpose computer where a user attempts to multi-task while this communication with the destination computer takes place. So, in such a scenario, it may be that the source computer receives from the destination computer an indication of its processing ability. This indication may be a measure of its raw processing power, such as FLOPS or floating-point operations per second, as well as what codecs it is configured to decode, and whether it has special ability to decode any particular codecs—such as specialized circuitry for decoding H.264. Based on this indication received from the destination computer, the source computer may determine how much of the work of the communication session the destination computer may perform, and also the parameters of the communication (for instance, the codec to be used and the settings for the codec) that reduce or minimize the amount of processing resources that the source computer devotes to the communication session.

Operation 418 depicts 9 determining an amount of available processing resources of the source computer not used by a user application; and wherein encoding the first screen data with a remote presentation protocol comprises: encoding the first screen using no more than the amount of available processing resources. A user of the source computer may not just be conducting this communication with the destination computer and wireless display—he or she may be executing applications that create graphics to be displayed on the wireless display, such as a video player application. In such a scenario, it may be decided that the encoding will not affect any of the user's executing applications, and will use only those processing resources that are free, or not otherwise used by another application. For instance, where 80% of the source computer's CPU cycles are in use by other user applications, the encoding may be throttled so as to not attempt to use more than 20% of the source computer's CPU cycles.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for displaying images on a wireless display with high fidelity and interactivity, comprising:
    establishing, by a source computer, a wireless communication channel between a user console session of the source computer and a destination computer, the destination computer being configured to display screen data on the wireless display;
    determining, by the source computer, first screen data of the user console session to be displayed on the wireless display;
    determining a sound of the user console session to be played contemporaneously with displaying the first screen data;
    encoding, by the source computer, the first screen data with a remote presentation protocol (RPP) to identify a first time stamp, and encoding the sound to identify a second time stamp, the first time stamp and the second time stamp indicating to play the sound contemporaneously with the wireless display displaying the decoded first screen data; and
    sending, by the source computer, the encoded first screen data to the destination computer from the user console session, without the encoded first screen data being transmitted through a second user session, for the destination computer to decode the encoded first screen data and the sound and display the decoded first screen data on the wireless display while contemporaneously playing the sound.

2. The method of claim 1, further comprising:
    encoding second screen data of the user console session with the remote presentation protocol;
    sending the encoded second screen data to the destination computer from the user console session, without the encoded second screen data being transmitted through the second user session; and sending a priority of the second screen data to the destination computer, for the destination computer to display decoded second screen data on the wireless display before displaying the decoded first screen data on the wireless display.

3. The method of claim 2, wherein sending the priority of the second screen data to the wireless display occurs in response to:

determining that the second screen data corresponds to input to the source computer.

4. The method of claim 3, wherein the input to the source computer comprises:

a change in cursor position or a change in a shape.

5. The method of claim 1, further comprising:

determining an indication of user input of the user console session to be delivered contemporaneously with displaying the decoded first screen data;

encoding the indication of user input with the RPP; and sending the encoded indication of user input to the destination computer from the user console session, without the encoded user input being transmitted a second user session, for the destination computer to display the indication of user input contemporaneously with the wireless display displaying the decoded first screen data.

6. The method of claim 1, further comprising:

determining a maximum decoding capability of the destination computer; and wherein encoding the first screen data with the remote presentation protocol comprises: encoding the first screen data based on the maximum decoding capability.

7. The method of claim 1, further comprising:

determining an amount of available processing resources of the source computer not used by a user application; and wherein encoding the first screen data with the remote presentation protocol comprises: encoding the first screen in real-time based on the amount of available processing resources.

8. The method of claim 1, wherein encoding the first screen data with the RPP comprises:

encoding a first portion of the first screen data with a first codec; and encoding a second portion of the first screen data with a second codec, the second codec differing from the first codec.

9. The method of claim 8, wherein the first portion comprises a representation of text, and the second portion comprises an image.

10. The method of claim 1, wherein the first screen data comprises:

a computer desktop that is mirrored between the user console session and the display, or a computer desktop that is extended from the user console session to the display.

11. A system, comprising:

a memory bearing instructions that, upon execution by a processor, cause the system at least to:

establish a wireless communication channel between a user console session of a source computer and a destination computer, the destination computer being configured to display screen data on a wireless display;

determine first screen data of the user console session to be displayed on the wireless display;

determine a sound of the user console session to be played contemporaneously with displaying the first screen data;

encode the first screen data to identify a first time stamp, and encoding the sound to identify a second time stamp, the first time stamp and the second time stamp indicating to play the sound contemporaneously with the display displaying the decoded first screen data; and send the encoded first screen data to the destination computer from the user console session, without the encoded first screen data being transmitted a second user session.

12. The system of claim 11, wherein the memory further bears instructions that, when executed on the processor, cause the system at least to:

encode second screen data of the user console session with a remote presentation protocol;

send the encoded second screen data to the destination computer from the user console session, without the encoded second screen data being transmitted a second user session; and send a priority of the second screen data to the destination computer.

13. The system of claim 11, wherein the memory further bears instructions that, when executed on the processor, cause the system at least to:

determine an indication of user input of the user console session to be delivered contemporaneously with displaying the decoded first screen data;

encode the indication of user input; and send the encoded indication of user input to the destination computer from the user console session, without the encoded indication of user input being transmitted a second user session.

14. The system of claim 11, wherein the instructions that, when executed on the processor, cause the system at least to encode the first screen data further cause the system at least to:

determine a maximum decoding capability of the destination computer; and encode the first screen data based on the maximum decoding capability.

15. The system of claim 11, wherein the instructions that, when executed on the processor, cause the system at least to encode the first screen data further cause the system at least to:

determine an amount of available processing resources of the source computer not used by a user application; and encode the first screen data in real-time based on the amount of available processing resources.

16. The system of claim 11, wherein the instructions that, when executed on the processor, cause the system at least to encode the first screen data further cause the system at least to:

encode a first portion of the first screen data with a first codec; and encode a second portion of the first screen data with a second codec, the second codec differing from the first codec.

17. A computer-readable storage device, bearing computer-executable instructions that, when executed on a computer, cause the computer to perform operations comprising:

establishing a wireless communication channel between a user console session of a source computer and a destination computer, the destination computer being configured to display screen data on a wireless display;

determining first screen data of the user console session to be displayed on the wireless display;

determining a sound of the user console session to be played contemporaneously with displaying the first screen data;

encoding the first screen data to identify a first time stamp, and encoding the sound to identify a second time stamp, the first time stamp and the second time stamp indicating to play the sound contemporaneously with the display displaying the decoded first screen data; and sending the encoded first screen data to the destination computer from the user console session, without the encoded first screen data being transmitted a second user session, such that the destination computer will decode the encoded first screen data and the sound and display the decoded first screen data on the wireless display while contemporaneously playing the sound.

18. The computer-readable storage device of claim 17, further bearing computer-executable instructions that, when executed on the computer, cause the computer to perform operations comprising:

determining an indication of user input of the user console session to be delivered contemporaneously with displaying the decoded first screen data;

encoding the indication of user input; and sending the encoded indication of user input to the destination computer from the user console session, without the encoded user input being transmitted a second user session, such that the destination computer will display the indication of user input contemporaneously with the display displaying the decoded first screen data.

19. The computer-readable storage device of claim 17, wherein encoding the first screen data comprises:

encoding a first portion of the first screen data with a first codec; and encoding a second portion of the first screen data with a second codec, the second codec differing from the first codec.

20. The computer-readable storage device of claim 17, wherein the wireless display comprises a display that lacks a wired communications channel between the source computer and the destination computer, the destination computer being configured to display screen data on the wireless display.

* * * * *